United States Patent
Sung et al.

(10) Patent No.: US 9,482,903 B2
(45) Date of Patent: Nov. 1, 2016

(54) DISPLAY DEVICE HAVING A MOISTURE BARRIER LAYER AND METHOD OF MANUFACTURING THE SAME

(71) Applicant: SAMSUNG DISPLAY CO., LTD., Yongin, Gyeonggi-Do (KR)

(72) Inventors: Woo Yong Sung, Seoul (KR); A Ram Lee, Hwaseong-si (KR); Tae Woon Cha, Seoul (KR); Sang Youn Han, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 229 days.

(21) Appl. No.: 13/735,853

(22) Filed: Jan. 7, 2013

(65) Prior Publication Data

US 2014/0063424 A1    Mar. 6, 2014

(30) Foreign Application Priority Data

Sep. 4, 2012  (KR) .................. 10-2012-0097862

(51) Int. Cl.
*G02F 1/1339* (2006.01)
*G02F 1/1341* (2006.01)
*G02F 1/1333* (2006.01)

(52) U.S. Cl.
CPC ........... *G02F 1/1339* (2013.01); *G02F 1/1341* (2013.01); *G02F 2001/133311* (2013.01)

(58) Field of Classification Search
CPC ............... G02F 1/1339; G02F 1/1341; G02F 2001/133311
See application file for complete search history.

(56) References Cited

U.S. PATENT DOCUMENTS

| 2004/0201027 A1* | 10/2004 | Ghosh ................. H01L 51/5237 257/99 |
| 2005/0253490 A1 | 11/2005 | Ehrlich |
| 2007/0215663 A1 | 9/2007 | Chongson et al. |
| 2008/0299288 A1* | 12/2008 | Kobrin et al. ................. 427/2.1 |
| 2010/0078058 A1 | 4/2010 | Nightingale et al. |
| 2011/0228192 A1 | 9/2011 | Hollaway |
| 2013/0050632 A1* | 2/2013 | Yoneya et al. ................. 349/153 |

FOREIGN PATENT DOCUMENTS

| JP | 2005116535 A | 4/2005 |
| JP | 2007219364 A * | 8/2007 |
| KR | 1020030044793 A | 6/2003 |
| KR | 1020060100899 A | 9/2006 |
| KR | 1020070121428 A | 12/2007 |
| KR | 1020080098093 A | 11/2008 |
| KR | 1020100105262 A | 9/2010 |
| KR | 1020120008360 A | 1/2012 |
| KR | 1020120012891 A | 2/2012 |

OTHER PUBLICATIONS

Seo et al. "Water permeation through organic-inorganic multilayer thin films," Thin Solid Films 520 (2012) 6690-6694.*

* cited by examiner

*Primary Examiner* — Jessica M Merlin
(74) *Attorney, Agent, or Firm* — Cantor Colburn LLP

(57) ABSTRACT

A display device includes a lower display panel, an upper display panel facing the lower display panel, a metal oxide layer surrounding outermost surfaces of the upper display panel and the lower display panel, and a barrier layer surrounding the metal oxide layer. The barrier layer includes a self-assembled monolayer.

10 Claims, 3 Drawing Sheets

DISPLAY DEVICE HAVING A MOISTURE BARRIER LAYER AND METHOD OF MANUFACTURING THE SAME

This application claims priority to Korean Patent Application No. 10-2012-0097862 filed on Sep. 4, 2012, and all the benefits accruing therefrom under 35 U.S.C. §119, the entire contents of which are incorporated herein by reference.

BACKGROUND (a) Field

The invention relates to a display device and a method of manufacturing the same.

(b) Description of the Related Art

A liquid crystal display that is a representative flat surface display device has merits in that a thickness and a weight are relatively small and power consumption is low, thus being frequently used in monitors, laptops, mobile phones, and large-size televisions.

Generally, the liquid crystal display includes a liquid crystal panel displaying an image by using light transmittance of liquid crystal, a backlight assembly disposed relative to a lower portion of the liquid crystal panel to provide light to the liquid crystal panel, a printed circuit board ("PCB") driving the liquid crystal panel, and a flexible circuit film electrically connecting the PCB and the liquid crystal panel.

The liquid crystal panel includes a first display panel including a plurality of pixel portions and electrically connected to the PCB by the flexible circuit film, a second display panel disposed to face the first display panel, a liquid crystal layer interposed between the first and the second display panels, a sealing member interposed between the first and the second display panels to seal the liquid crystal layer, and the like.

Generally, the flexible circuit film may include a circuit film for applying a gate signal or a data signal to the first display panel.

The circuit film may be at a left end or an upper end of the first display panel, and a gate pad or a data pad is at the left end or the upper end at which the circuit film is disposed, thus, the second display panel has a planar size that is smaller than that of the first display panel. That is, since the second display panel has the size that is smaller than that of the first display panel, the left end or the upper end of the first display panel is exposed from the second display panel.

Moisture may be transmitted from outside the display panels to the left end or the upper end of the first display panel. Moisture may be undesirably spread along the surface of the first display panel and transmitted to between the first and the second display panels, thus deteriorating a display quality of the liquid crystal display.

A silicon glue material, an acryl-based sealant material or the like may be used in order to prevent transmission of moisture along and/or into the liquid crystal panel. However, since these materials have high moisture transmittance, there is a limit in preventing moisture transmission along and/or into the liquid crystal panel. Therefore, there remains a need for an improved display device which reduces or effectively prevents moisture from transmitting thereinto.

SUMMARY

One or more exemplary embodiment of the invention provides a display device having an excellent moisture blocking characteristic, and a method of manufacturing the same.

An exemplary embodiment of the invention provides a display device including a lower display panel, an upper display panel facing the lower display panel, a metal oxide layer surrounding outermost surfaces of the upper display panel and the lower display panel, and a barrier layer surrounding the metal oxide layer. The barrier layer includes a self-assembled monolayer.

The self-assembled monolayer may include a silane compound or a thiol compound.

The self-assembled monolayer may include at least one of octadecyltrichlorosilane ("OTS"), perfluorooctyltrichlorosilane ("FOTS"), and dichlorodimethylsilane ("DDMS").

The self-assembled monolayer may include fluorine.

The metal oxide layer may include at least one of silicon oxide, aluminum oxide, tantalum nitride and titanium nitride.

The display device may further include a sealing member between the lower display panel and the upper display panel. The metal oxide layer and the barrier layer may surround the outermost surfaces of the upper display panel, the lower display panel and the sealing member.

The display device may further include a polarizer on at least one of an outer surface of the lower display panel and an outer surface of the upper display panel. The metal oxide layer and the barrier layer may surround the polarizer.

A moisture prevention layer includes the metal oxide layer and the barrier layer, and a moisture transmission rate of the moisture prevention layer may be less than $10^{-4}$ g/m$^2$/day.

Another exemplary embodiment of the invention provides a display device including: a lower display panel, an upper display panel facing the lower display panel, a sealing member between the lower display panel and the upper display panel, and a hydrophobic barrier layer surrounding outermost surfaces of the upper display panel, the lower display panel and the sealing member. Applying a surface treatment by a gas including fluorine, to outermost surfaces of the display panel, forms the hydrophobic barrier layer.

The display device may further include a metal oxide layer between the barrier layer and the upper display panel, and between the barrier layer and the lower display panel.

The metal oxide layer may include at least one of silicon oxide, aluminum oxide, tantalum nitride and titanium nitride.

The display device may further include a polarizer on at least one of an outer surface of the lower display panel and an outer surface of the upper display panel. The barrier layer may surround the polarizer.

Yet another exemplary embodiment of the invention provides a method of manufacturing a display device, the method including providing a lower display panel, and an upper display panel facing the lower display panel, providing a sealing member between the lower display panel and the upper display panel, providing a metal oxide layer surrounding outermost surfaces of the lower display panel, the upper display panel and the sealing member, and providing a barrier layer surrounding the metal oxide layer. The barrier layer includes a self-assembled monolayer.

The self-assembled monolayer may include a silane compound or a thiol compound.

The self-assembled monolayer may include at least one of OTS, FOTS and DDMS.

The self-assembled monolayer may include fluorine.

The metal oxide layer may include at least one of silicon oxide, aluminum oxide, tantalum nitride and titanium nitride.

Still another exemplary embodiment of the invention provides a method of manufacturing a display device, the method including providing a lower display panel, and an upper display panel facing the lower display panel, providing a sealing member between the lower display panel and the upper display panel, and providing a hydrophobic barrier layer surrounding outermost surfaces of the lower display panel, the upper display panel and the sealing member. The hydrophobic barrier layer is formed by a gas including fluorine.

The method of manufacturing a display device may further include providing a metal oxide layer between the barrier layer and the upper display panel, and between the barrier layer and the lower display panel.

The metal oxide layer may include at least one of silicon oxide, aluminum oxide, tantalum nitride and titanium nitride.

According to one or more exemplary embodiment of the invention, a display device includes a hydrophobic barrier layer for blocking moisture. The barrier layer includes a self-assembling single molecule layer (monolayer) or fluorine as being formed by a gas including fluorine, on an outermost surface of the display device, thus efficiently blocking moisture from transmitting into a display panel of the display device.

BRIEF DESCRIPTION OF THE DRAWINGS

The above and other features of this disclosure will become more apparent by describing in further detail, exemplary embodiments thereof with reference to the accompanying drawings in which.

DETAILED DESCRIPTION

Figure 1:
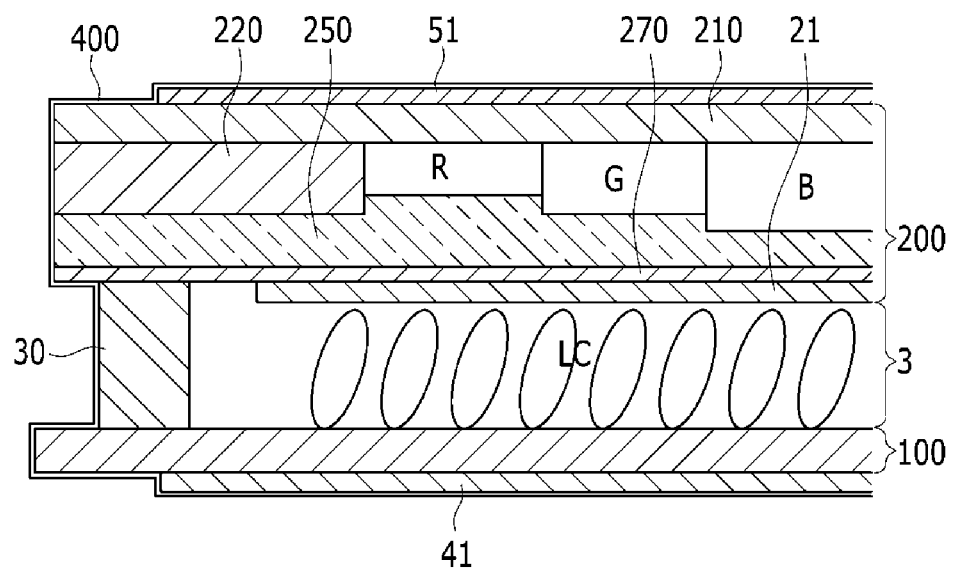
FIG. 1 is a cross-sectional view showing an exemplary embodiment of a display device according to the invention.

Exemplary embodiments of the invention will be described in detail with reference to the accompanying drawings. As those skilled in the art would realize, the described embodiments may be modified in various different ways, all without departing from the spirit or scope of the invention. On the contrary, exemplary embodiments introduced herein are provided to make disclosed contents thorough and complete and sufficiently transfer the spirit of the invention to those skilled in the art.

In the drawings, the thickness of layers, films, panels, regions, etc., are exaggerated for clarity. Further, it will be understood that when a layer is referred to as being "on" another layer or substrate, it can be directly on the other layer or substrate, or intervening them may also be present. Like reference numerals designate like elements throughout the specification. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "above" relative to the other elements or features. Thus, the exemplary term "under" can encompass both an orientation of above and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

FIG. 1 is a cross-sectional view showing an exemplary embodiment of a display device according to the invention.

The exemplary embodiment of the display device according to the invention may be applied to most display devices that can be undesirably affected by moisture, such as a liquid crystal display, an organic light emitting device and an electrophoretic display. Hereinafter, a liquid crystal display will be described as an example.

Referring to FIG. 1, the exemplary embodiment of the display device according to the invention includes a lower display panel 100, an upper display panel 200, and a liquid crystal ("LC") layer 3 interposed between the lower display panel 100 and the upper display panel 200. The LC layer 3 may include LC molecules. A sealing member 30 is positioned along an outer portion such as periphery of a display region or display area of the display device and between the lower display panel 100 and the upper display panel 200. An image may be displayed in the display region of the display device, while the image is not displayed in a non-display region excluding the display region of the display device.

The display panel including the lower display panel 100, the upper display panel 200 and the LC layer 3 displays an image by adjusting transmittance of light emitted from a backlight device (not shown) according to an image signal, and may include a spacer (not shown) maintaining an interval between the lower display panel 100 and the upper display panel 200.

The upper display panel 200, as shown in FIG. 1, includes color filters R, G and B, a black matrix 220, a common electrode 270 and the like, on an upper base substrate 210. The upper display panel 200 may further include an overcoat layer 250 positioned under the color filters R, G and B, where the common electrode 270 is positioned under the overcoat layer 250. The overcoat layer 250 protects and planarizes the layers thereunder. While the common electrode 270 is in the upper display panel 200, the invention is not limited thereto or thereby. Alternatively, the common electrode 270 may be in the lower display panel 100 according to a mode of the LC and the display device. Additionally, the color filters R, G and B and/or the black matrix 220 illustrated in the upper display panel 200 may be in the lower display panel 100 to improve an opening rate of the display device.

Although not shown, the lower display panel 100 may include a signal wire such as a data line and a gate line, and a thin film transistor connected to the data line and the gate line. In an exemplary embodiment, the thin film transistor may be at a portion where the data line and the gate line cross, but is not limited thereto or thereby. The lower display panel 100 may also include a pixel electrode, where the thin film transistor is connected to a pixel electrode, and responds to a scan signal from the gate line to transfer an input signal received from the data line to the pixel electrode.

The lower display panel may also include one or more pad regions each connected to the data line and the gate line in a portion of the lower display panel 100. A circuit film connected to a printed circuit board ("PCB") and applying a driving signal to the thin film transistor may be mounted in the one or more pad regions.

The exemplary embodiment of the display device according to the invention includes a barrier layer 400 surrounding outermost surfaces of the lower display panel 100, the upper display panel 200 and the sealing member 30. The barrier layer 400 may be a continuous member, such as being a single, unitary, indivisible member. The barrier layer 400 contacts the outermost surfaces of the lower display panel 100, the upper display panel 200 and the sealing member 30. In one exemplary embodiment, the barrier layer 400 may be formed by performing a surface treatment by a gas including fluorine, and may have hydrophobicity. The surface treatment may include plasma treatment, but is not limited thereto or thereby.

An exemplary embodiment of the barrier layer 400 may be a self-assembled monolayer. The self-assembled monolayer may be defined as an organic single molecule layer voluntarily formed on a layer solid surface. The self-assembled monolayer defining the barrier layer 400 may include at least one of octadecyltrichlorosilane ("OTS"), perfluorooctyltrichlorosilane ("FOTS"), and dichlorodimethylsilane ("DDMS").

Herein, the self-assembled monolayer may include a compound including fluorine in order to increase a contact angle according to moisture transmission. The aforementioned FOTS is an example, and the self-assembled monolayer is not limited thereto or thereby. The barrier layer 400 may include a thiol-based compound in addition to a silane-based compound.

In the exemplary embodiment of the display device according to the invention, polarizers 41 and 51 are positioned on a respective outermost lower and upper surface of the lower display panel 100 and the upper display panel 200. The display device may further include an alignment layer 21 positioned between the common electrode 270 and the LC layer 3. Although not shown in the drawings, an additional alignment layer may be between the lower display panel 100 and the LC layer 3. The barrier layer 400 may surround the polarizers 41 and 51 and may be directly in contact with the polarizers 41 and 51. In an alternative exemplary embodiment, any one of the polarizers 41 and 51 on the outermost surfaces of the lower display panel 100 and the upper display panel 200 may be omitted.

Figure 2:
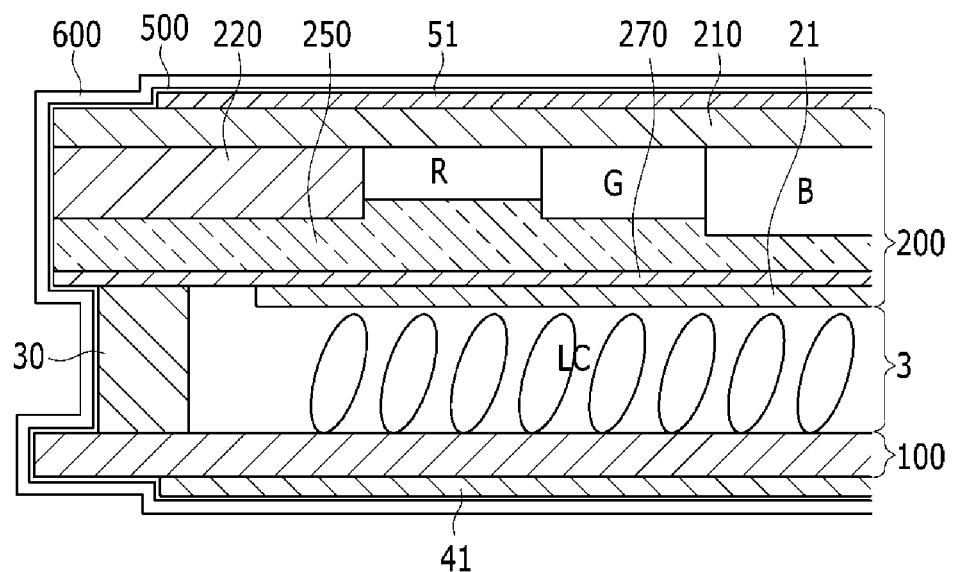
FIG. 2 is a cross-sectional view showing another exemplary embodiment of a display device according to the invention.

FIG. 2 is a cross-sectional view showing another exemplary embodiment of a display device according to the invention.

Since most elements of the exemplary embodiment of the invention shown in FIG. 2 are the same as those of the exemplary embodiment described in FIG. 1, only differences will be described.

Referring to FIG. 2, the exemplary embodiment of the display device according to the invention includes a metal oxide layer 500 surrounding the outermost surfaces of the lower display panel 100, the upper display panel 200 and the sealing member 30. The metal oxide layer 500 may be a continuous member, such as being a single, unitary, indivisible member. The metal oxide layer 500 contacts the outermost surfaces of the lower display panel 100, the upper display panel 200 and the sealing member 30. The metal oxide layer 500 includes at least one of silicon oxide, aluminum oxide (Al2O3), tantalum nitride (TaN), and titanium nitride (TiN). In one exemplary embodiment, the metal oxide layer 500 may be formed by an atomic layer deposition ("ALD") method. In an alternative exemplary embodiment, a layer including a silicon nitride layer (SiN) may be used instead of the metal oxide layer 500.

A barrier layer 600 covers the metal oxide layer 500 which is on the outermost surfaces of the lower display panel 100, the upper display panel 200 and the sealing member 30. The barrier layer 600 may be a continuous member, such as being a single, unitary, indivisible member. The barrier layer 600 contacts the outermost surfaces of the metal oxide layer 500. In one exemplary embodiment, the barrier layer 600 may be formed by performing a surface treatment by a gas including fluorine, and may have hydrophobicity. The surface treatment may include plasma treatment, but is not limited thereto or thereby.

An exemplary embodiment of the barrier layer 600 may be a self-assembled monolayer. The self-assembled monolayer may be defined as an organic single molecule layer voluntarily formed on a layer solid surface. The self-assembled monolayer defining the barrier layer 600 may include at least one of OTS, FOTS and DDMS.

Herein, the self-assembled monolayer may include a compound including fluorine in order to increase a contact angle according to moisture transmission. The aforementioned FOTS is an example, and the self-assembled monolayer is not limited thereto or thereby. The barrier layer 600 may include a thiol-based compound in addition to a silane-based compound.

In the exemplary embodiment shown in FIG. 2, a moisture transmission rate of a moisture prevention layer having a double layer including the metal oxide layer and the self-assembled monolayer may be less than $10^{-4}$ g/m$^2$/day.

The features described with respect to FIG. 1 in addition to the aforementioned difference may be applied to the exemplary embodiment of FIG. 2.

As described above, the liquid crystal display is described as the display device, but features and elements of the exemplary embodiments of the display device of the invention may be applied to other display devices such as an organic light emitting device and an electrophoretic display. In another exemplary embodiment, the barrier layer may surround the outermost surface of a display panel including a thin film transistor in the organic light emitting device. Herein, the description regarding the barrier layer may be identically applied to the aforementioned liquid crystal display.

Figure 3:
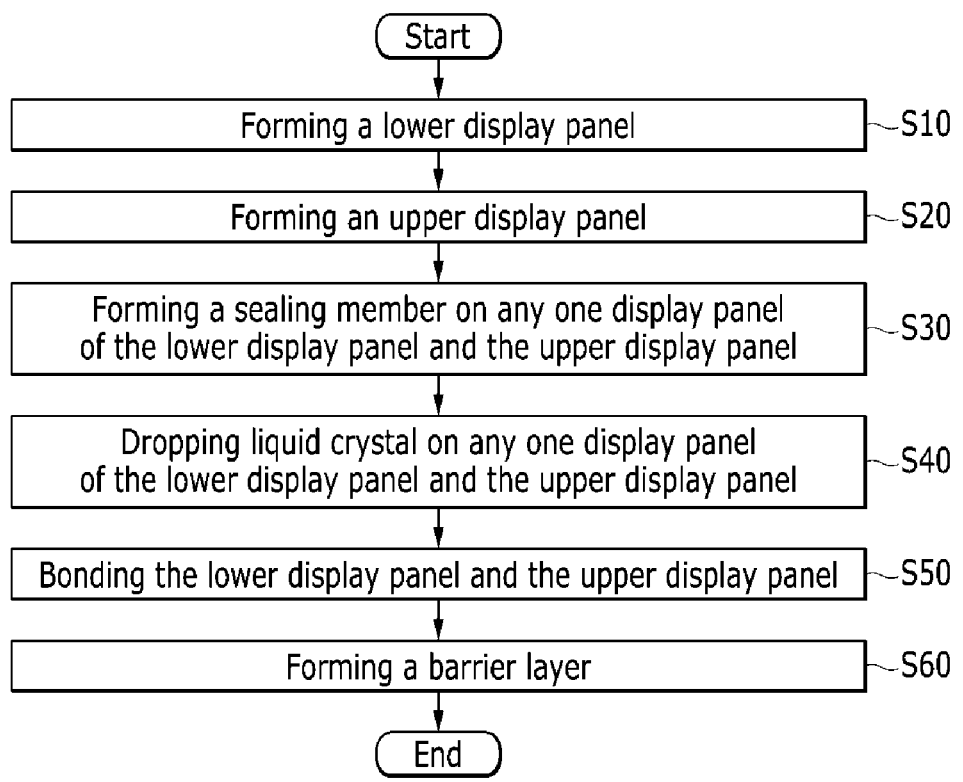
FIG. 3 is a flowchart showing an exemplary embodiment of a method of manufacturing a display device according to the invention.

FIG. 3 is a flowchart showing an exemplary embodiment of a method of manufacturing a display device according to the invention.

Referring to FIG. 3, the lower display panel 100 including the thin film transistor is formed (S10).

The lower display panel 100 includes the signal wire such as the data line and the gate line, the thin film transistor connected to the data line and the gate line, the pixel electrode connected to the thin film transistor, and the like. Further, the lower display panel may include the pad regions at a portion of the lower display panel 100 and respectively connected to the data line and the gate line.

The upper display panel 200 corresponding to the lower display panel is formed (S20).

The upper display panel 200 may include the color filters R, G and B, the black matrix 220, the common electrode 270, and the like.

Herein, the lower display panel 100 and the upper display panel 200 may be independently formed. That is, forming (e.g., providing) the lower display panel 100 (S10) may be first performed and forming the upper display panel 200 (S20) may be performed after forming the lower display panel 100, or forming the upper display panel 200 (S20) may be first performed and forming the lower display panel 100 (S10) may be performed after forming the upper display panel 200. Alternatively, forming the lower display panel 100 (S10) and forming the upper display panel 200 (S20) may be simultaneously performed.

The sealing member 30 is formed on any one display panel of the lower display panel 100 and the upper display panel 200 (S30).

The sealing member 30 is formed along the outer portion of a display region of the display device so as to be spaced from the display region in which an image is displayed. In an exemplary embodiment, for example, the sealing member may be in a non-display region of the display device. The sealing member is positioned along the outer portion of the display region of the display device and between the lower display panel 100 and the upper display panel 200.

Thereafter, LC is dropped on any one display panel of the lower display panel 100 and the upper display panel 200 to ultimately form the LC layer 3 (S40).

Herein, forming the sealing member 30 (S30) and dropping the LC (S40) may be independently performed. That is, forming the sealing member 30 (S30) may be first performed and dropping the LC (S40) may be performed thereafter, or dropping the LC (S40) may be first performed and forming the sealing member 30 (S30) may be performed thereafter. Alternatively, forming the sealing member 30 (S30) and dropping the LC (S40) may be simultaneously performed.

The sealing member 30 and the LC may be formed on a same display panel, or may be formed on different display panels of the lower and upper display panels 100 and 200.

The lower display panel 100 and the upper display panel 200 are bonded to each other (S50).

After the lower display panel 100 and the upper display panel 200 are bonded to each other, the LC layer 3 is formed between the lower display panel 100 and the upper display panel 200 by curing the sealing member 30 such as through infrared rays or ultraviolet rays, to seal the LC and interpose the LC between the lower display panel 100 and the upper display panel 200. In addition, the circuit film (not shown) connected to the PCB for applying the driving signal to the thin film transistor may be mounted in the pad region formed in a portion of the lower display panel 100.

Thereafter, the barrier layer is formed to surround the outermost surfaces of the display device including the lower display panel 100 and the upper display panel 200 (S60).

The barrier layer may be formed to continuously surround the outermost surfaces of the lower display panel 100, the upper display panel 200 and the sealing member 30. The barrier layer may be formed by performing surface treatment by a gas including fluorine, and may have hydrophobicity. The surface treatment may include plasma treatment. Since the barrier layer has hydrophobicity, a contact angle is larger than 90°, and a possibility of transmitting external moisture along and/or between the lower and upper display panels 100 and/or 200 is reduced.

An exemplary embodiment of the barrier layer may be formed with the self-assembled monolayer. The self-assembled monolayer may be defined as an organic single molecule layer voluntarily formed on a layer solid surface, and may include at least one of OTS, FOTS and DDMS. Herein, the self-assembled monolayer may be formed of a compound including fluorine in order to increase a contact angle according to moisture transmission. The aforementioned FOTS is provided as an example, but the self-assembled monolayer is not limited thereto or thereby. The barrier layer may include a thiol-based compound in addition to a silane-based compound.

In an exemplary embodiment, before the barrier layer is formed, the polarizer may be formed on at least one of the outer surfaces of the upper display panel 200 and the lower display panel 100. The barrier layer may be formed to surround the outermost surface of the polarizer as well as the outermost surfaces of the upper display panel 200, the lower display panel 100 and the sealing member 30, and may be deposited directly on the polarizer.

In another exemplary embodiment, before the barrier layer is formed, the metal oxide layer may be formed to continuously surround the outermost surfaces of the lower display panel 100, the upper display panel 200 and the sealing member 30. The metal oxide layer includes at least one of silicon oxide, aluminum oxide (Al2O3), tantalum nitride (TaN) and titanium nitride (TiN). The metal oxide layer may be formed by an ALD method. If the metal oxide layer is formed as described above, thereafter, in one exemplary embodiment where the silane-based self-assembled monolayer is formed on the metal oxide layer, an excellent contact characteristic may be ensured.

In another exemplary embodiment, after the barrier layer is formed, there may be no additional pattern process, and a display device cover member (not shown) for receiving the lower display panel 100 and the upper display 200 panel may be formed such as by a module process.

What is claimed is:

1. A display device comprising:
   a lower display panel,
   an upper display panel facing the lower display panel,
   a first polarizer directly on an outer surface of the upper display panel and a second polarizer directly on an outer surface of the lower display panel, the first polarizer defining an outermost surface of the upper display panel and the second polarizer defining an outermost surface of the lower display panel,
   a barrier layer surrounding outermost surfaces of the upper display panel and the lower display panel, the barrier layer comprising a self-assembled monolayer; and
   a metal oxide layer directly between the barrier layer and the outermost surface of the upper display panel, and directly between the barrier layer and the outermost surface of the lower display panel,
   wherein the metal oxide layer comprises one selected from aluminum oxide, tantalum nitride, titanium nitride, and combination thereof.

2. The display device of claim 1, wherein:
   the self-assembled monolayer comprises a silane compound or a thiol compound.

3. The display device of claim 2, wherein:
   the self-assembled monolayer comprises one selected from octadecyltrichlorosilane, perfluorooctyltrichlorosilane, dichlorodimethylsilane, and combination thereof.

4. The display device of claim 2, wherein:
   the self-assembled monolayer comprises fluorine.

5. The display device of claim 1, further comprising:
   a sealing member between the lower display panel and the upper display panel,
   wherein the metal oxide layer and the barrier layer surround outermost surfaces of the sealing member, the upper display panel and the lower display panel.

6. The display device of claim 1, wherein:
   a moisture prevention layer comprises the metal oxide layer and the barrier layer, and a moisture transmission rate of the moisture prevention layer is less than $10^{-4}$ g/m²/day.

7. A method of manufacturing a display device, the method comprising:
   providing a lower display panel and an upper display panel facing the lower display panel,
   providing a sealing member between the lower display panel and the upper display panel,
   providing a first polarizer directly on an outer surface of the upper display panel and a second polarizer directly on an outer surface of the lower display panel, the first polarizer defining an outermost surface of the upper display panel and the second polarizer defining an outermost surface of the lower display panel,
   providing a barrier layer surrounding outermost surfaces of the lower display panel, the upper display panel and the sealing member, the barrier layer comprising a self-assembled monolayer, and
   providing a metal oxide layer directly between the barrier layer and the outermost surface of the upper display panel, and directly between the barrier layer and the outermost surface of the lower display panel,
   wherein the metal oxide layer comprises one selected from aluminum oxide, tantalum nitride, titanium nitride, and combination thereof.

8. The method of manufacturing a display device of claim 7, wherein:
   the self-assembled monolayer comprises a silane compound or a thiol compound.

9. The method of manufacturing a display device of claim 8, wherein:
   the self-assembled monolayer comprises at least one of octadecyltrichlorosilane, perfluorooctyltrichlorosilane and dichlorodimethylsilane.

10. The method of manufacturing a display device of claim 8, wherein:
    the self-assembled monolayer comprises fluorine.

* * * * *